United States Patent
Schneider et al.

(10) Patent No.: US 6,848,705 B2
(45) Date of Patent: Feb. 1, 2005

(54) AIRBAG COVER WITH MULTI-AXIS DEPLOYMENT

(75) Inventors: David W. Schneider, Waterford, MI (US); Steven R. Fredin, Ortonville, MI (US)

(73) Assignee: Autoliv ASP, Inc., Ogden, UT (US)

(*) Notice: Subject to any disclaimer, the term of this patent is extended or adjusted under 35 U.S.C. 154(b) by 102 days.

(21) Appl. No.: 10/104,236

(22) Filed: Mar. 20, 2002

(65) Prior Publication Data

US 2003/0178818 A1 Sep. 25, 2003

(51) Int. Cl.⁷ .......................... B60R 21/20; B60R 21/16
(52) U.S. Cl. ................................................ 280/728.3
(58) Field of Search ..................... 280/728.3, 731

(56) References Cited

U.S. PATENT DOCUMENTS

| | | | |
|---|---|---|---|
| 4,903,986 A | 2/1990 | Cok | |
| 5,002,307 A | 3/1991 | Heidorn | |
| 5,013,064 A | 5/1991 | Miller | |
| 5,135,255 A | 8/1992 | Henseler | |
| 5,174,602 A | 12/1992 | Nakayama | |
| 5,320,380 A | * 6/1994 | Hamada et al. | 280/728.3 |
| 5,855,391 A | * 1/1999 | Holland | 280/728.3 |
| 5,893,581 A | * 4/1999 | Niederman | 280/731 |
| 5,957,484 A | 9/1999 | Levine | |
| 2002/0175501 A1 | * 11/2002 | Jenkins et al. | 280/728.3 |

FOREIGN PATENT DOCUMENTS

JP             04110251 A   *   4/1992

* cited by examiner

Primary Examiner—Ruth Ilan
(74) Attorney, Agent, or Firm—Sally J. Brown (57) ABSTRACT

Enhanced airbag covers and associated methods are disclosed. Each of the covers permits deployment of a compacted airbag cushion along multiple axes, thereby decreasing the relative momentum of the airbag and the vehicle occupant, and enhancing the ability of the cushion to protect vehicle occupants who are out of their nominal positions. Covers may include two frontal portions separated by a frontal seam that tears open to permit emergence of the cushion between the frontal portions. In addition, each cover may have a peripheral skirt that opens to permit emergence of the compacted cushion along additional axes. The peripheral skirt may have peripheral seams and connecting seams that facilitate opening of the skirt portion. The peripheral and connecting seams may be configured such that the peripheral skirt opens consistently, regardless of whether the frontal seam has separated.

25 Claims, 5 Drawing Sheets

AIRBAG COVER WITH MULTI-AXIS DEPLOYMENT

BACKGROUND OF THE INVENTION

1. Field of the Invention

The present invention relates to systems and methods for protecting vehicle occupants from injury. More specifically, the present invention relates to covers that permit multi-axis deployment of inflatable cushions.

2. Description of Related Art

The inclusion of inflatable safety restraint devices, or airbags, is now a legal requirement for many new vehicles. Airbags are typically installed in the steering wheel and in the dashboard on the passenger side of a car. Additionally, airbags may be installed to inflate beside the passenger to provide side impact protection, in front of the knees to protect the knees from impact, or at other strategic locations.

In the event of an accident, an accelerometer within the vehicle measures the abnormal deceleration and triggers the ignition of an explosive charge. Expanding gases from the charge fill the airbags, which immediately inflate to protect the driver and/or passengers from impact against the interior surfaces of the vehicle. During normal vehicle operation, airbags are typically stowed behind covers to protect them from tampering and provide a more attractive interior facade for the vehicle.

Unfortunately, vehicle occupants may move considerably from optimal impact positions. For example, a passenger may be adjusting the radio or air conditioning settings, tending to a child in the rear seat, reclining in the seat, or otherwise moving in a manner that positions part of their body outside the protection zone for a typical prior art airbag. Hence, when impact occurs, a part of the person's body may strike the vehicle interior outside the perimeter of the airbag, or the person may even be injured in some manner by the inflating airbag.

This problem is caused, at least in part, by the fact that many known airbags inflate only in a single direction, which is often toward the person. For example, front impact airbags typically inflate primarily in a rearward direction, directly toward the driver or passenger. Hence, interior surfaces of the vehicle that surround the stowed position of the cushion may not be sufficiently covered by the cushion by the time the person's body moves toward them. Thus, such surfaces are exposed to receive impact with parts of the person's body that are not aligned with the inflating cushion.

Furthermore, the momentum of the deploying cushion can also be a source of injury to vehicle occupants. When the majority of the gas produced is directed toward the occupant, the mass of the gas will create significant momentum in the deploying cushion. The momentum of the bag toward the person has an additive effect on the momentum of the person toward the bag, thus making the impact more dramatic.

The deployment of known cushions is often determined, at least in part, by the configuration of the covers that contain them. Many known covers have seams arranged to permit emergence of the cushion in essentially a single direction. Lateral or transverse deployment of the cushion is restricted by walls of the cover.

Accordingly, a need exists for airbag covers that permit deployment of a compacted cushion along multiple directions. Such covers are needed for a wide variety of airbag types, including driver's side airbags, passenger's side airbags, side impact airbags or "inflatable curtains," and knee bolsters. Multi-axis deployment should preferably occur in normal operation of the cover, and not simply in the event that deployment toward the person is obstructed. Furthermore, such a cover should preferably be easily manufactured and installed in a vehicle.

SUMMARY OF THE INVENTION

The apparatus and method of the present invention have been developed in response to the present state of the art, and in particular, in response to the problems and needs in the art that have not yet been fully solved by currently available airbags. Thus, it is an overall objective of the present invention to provide airbag covers and associated methods that permit consistent multi-axis deployment. Such covers may provide enhanced protection for vehicle occupants that are outside their nominal positions when impact occurs without unduly adding to the momentum of the person's impact with the cushion.

To achieve the foregoing objective, and in accordance with the invention as embodied and broadly described herein in the preferred embodiment, enhanced airbag covers and associated methods are provided. According to one embodiment, an airbag cover according to the invention may have a vehicle attachment portion configured to be attached to a vehicle and a deployment portion that opens to permit emergence of the compacted cushion. The deployment portion may be divided generally into a first section and a second section that split from each other to release the cushion.

The deployment portion may include a first frontal portion within the first section and a second frontal portion within the second section. A peripheral skirt may be disposed inward of the frontal portions. The peripheral skirt may have a rectangular, somewhat tapered shape. The peripheral skirt may be separable into four peripheral portions, one or more of which open away from the compacted cushion to provide for emergence of the cushion through the peripheral skirt as well as the frontal portions.

The frontal portions may be connected together by a frontal seam disposed generally horizontally between the frontal portions. The skirt portion may have one or more peripheral seams that open to permit emergence of the cushion through one or more of the peripheral portions. Connecting seams may also be used to permit separation of peripheral portions from the vehicle attachment portion and/or from the frontal portions, to further facilitate multi-axis deployment. The seams may be thinned regions of cover material formed after creation of the basic cover shape through a method such as mechanical scoring, laser scoring, and ultrasonic scoring. The seams may also be formed simultaneously with creation of the basic cover shape, for example, through a method such as injection molding.

The peripheral seams may be positioned in-plane with the frontal seam, such that the third and fourth peripheral portions are each split by a peripheral seam. Hence, the third and fourth peripheral portions may each open to form a pair of flaps that remain attached to the first and second peripheral portions. The connecting seams may operate to separate the third and fourth peripheral portions from the frontal portions and from the vehicle attachment portion.

The cover may have a plurality of flexible regions that also facilitate deployment. The flexible regions may take the form of hinges, along which the cover material folds. Inner hinges may be disposed to permit pivotal motion of the first and second peripheral portions along with the frontal portions. Outer hinges may permit respective pivotal motion of the frontal portions and the first and second peripheral portions. Peripheral hinges may permit pivotal motion of the third and fourth peripheral portions. Hence, the compacted cushion may open along three axes, and in five directions. Such a configuration may, for example, be suitable for a driver's side airbag, a passenger's side airbag, or a knee bolster.

According to one alternative embodiment, the peripheral skirt may be rounded instead of rectangular, and may not be tapered. The frontal seam may be disposed vertically instead of horizontally. Hence, the frontal portions open sideways rather than up and down. Such a configuration may also be suitable for a driver's side airbag, a passenger's side airbag, or a knee bolster.

According to another alternative embodiment, the cover may have a somewhat elongated shape suitable for containing a longer cushion such as an inflatable curtain used for side impact protection. The frontal seam may once again be disposed horizontally so that the frontal portions are elongated in shape. Each of the frontal portions may have an arcuate shape. The peripheral skirt may have first and second peripheral portions joined to the frontal portions. Additionally, the peripheral skirt may have third and fourth portions, each of which has a rounded edge to properly interface with the arcuate frontal portions.

The peripheral seams may then be disposed between each of the peripheral portions such that all of the peripheral portions remain attached to the vehicle attachment portion. Hence, the third and fourth peripheral portions do not split, but simply pivot open to permit emergence of the compacted cushion. The connecting seams may, however, tear open to separate the third and fourth peripheral portions from the frontal portions. The frontal portions need not be attached to the first and second peripheral portions by hinges, but may simply pivot to open with the first and second peripheral portions.

Through the use of the covers and associated methods of the present invention, vehicle occupants may be more fully protected against injury. Occupants who are out of their nominal positions may obtain greater protection from cushions that inflate laterally and transversely as well as toward them. Additionally, multi-axis inflation may relieve a portion of the momentum imparted to the person by the airbag, thereby decreasing the possibility of injury due to impact with the airbag cushion.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 6, is not intended to limit the scope of the invention, as claimed, but is merely representative of presently preferred embodiments of the invention.

The present invention provides an apparatus and method whereby problems associated with previously known airbag covers can be resolved. More specifically, through the use of multiple deployment axes, an airbag cover may permit a compacted cushion to deploy laterally and/or transversely, substantially simultaneously with or even prior to frontal deployment. Hence, a vehicle occupant may be protected against out-of-position injury.

Furthermore, the present invention utilizes distribution of mass to reduce the impact momentum between the vehicle occupant and the airbag cushion. More specifically, the lateral and transverse deployment of the cushion distributes the mass of the cushion over a larger area. Additionally, the momentum of the gas is not uniformly toward the vehicle occupant; rather, a significant portion of the momentum is directed perpendicular to the direction in which the occupant moves toward the cushion.

Such principles may be applied to many types of airbags, including driver's side airbags, passenger's side airbags, knee bolsters and inflatable curtains. The manner in which the covers of the present invention utilize these principles to provide enhanced impact protection will be shown and described in greater detail with reference to FIGS. 1 through 6.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together.

Figure 1:
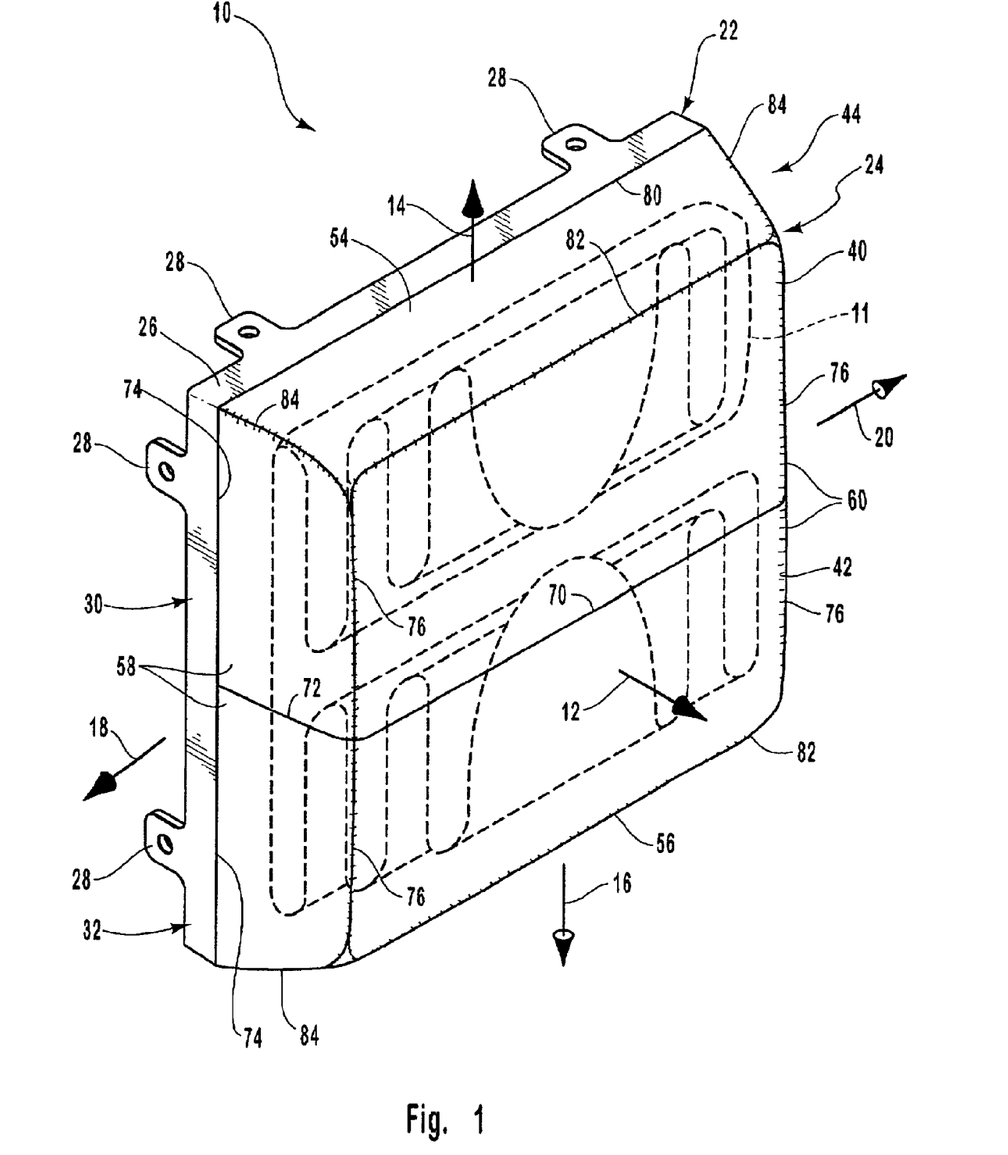
FIG. 1 is a perspective view of one embodiment of an airbag cover within the scope of the invention, in the stowed configuration with a compacted cushion disposed within the cover.

Referring to FIG. 1, a perspective view shows one embodiment of an airbag cover 10, or cover 10, within the scope of the present invention. As shown, the cover 10 may have a somewhat tapered, generally rectangular prismoidal shape. The cover 10 may be used, for example, for a front impact airbag designed to protect the head and torso, such as a driver's side airbag or a passenger's side airbag. Alternatively, the cover 10 may be used for an airbag designed to protect a different part of the body, such as a knee bolster or inflatable curtain.

A compacted cushion 11 is shown in phantom, disposed within the cover 10. An inflator (not shown) may be disposed behind the compacted cushion 11 to expel inflation gases into the compacted cushion 11, thereby inducing expansion of the compacted cushion 11 in response to a collision. The expanding compacted cushion 11 forces the cover 10 to open along deliberately weakened tear seams, which will be described subsequently. The cover 10, compacted cushion 11, inflator, and any other airbag components within the cover 10 may be referred to as an "airbag system."

The cover 10 may have a frontal direction 12 directed generally toward the vehicle occupant. The cover 10 may also have a first direction 14 perpendicular with the frontal direction 12, and a second direction 16 opposite to the first direction 14. Furthermore, the cover 10 may have a third direction 18 perpendicular to the frontal direction 12, the first direction 14, and the second direction 16, and a fourth direction 20 opposite to the third direction 18.

The cover 10 may have a vehicle attachment portion 22 designed to be attached to the interior of the vehicle (not shown), and a deployment portion 24 that opens to permit emergence of the compacted cushion 11. The vehicle attachment portion 22 may have a rim 26 disposed around the circumference of the cover 10. A plurality of tabs 28 may be disposed around the rim 26; the tabs 28 may have holes or other features designed to be affixed to suitable receiving features within the vehicle. If desired, the rim 26 may be disposed within a socket sized slightly larger than the cover 10, and the tabs 28 may then be attached to the interior of the socket through the use of mechanical fasteners such as bolts, nuts, clamps, clips, and the like.

The deployment portion 24 may have a first section 30 and a second section 32; the first and second sections 30, 32 may separate to permit emergence of the compacted cushion 11. The sections 30, 32 may separate in such a manner that the compacted cushion 11 deploys not only in the frontal direction 12, but also in one or more of the first, second, third, and fourth directions 14, 16, 18, 20.

The cover 10 may also have a first frontal portion 40 and a second frontal portion 42, positioned within the first section 30 and the second section 32, respectively. The frontal portions 40, 42 may be substantially perpendicular to the frontal direction 12, and may be generally rectangular in shape, as shown. A peripheral skirt 44 passes around the circumference of the cover 10, between the rim 26 and the frontal portions 30, 32. The peripheral skirt 44 may taper inward somewhat from the rim 26 to the frontal portions 30, 32. Such tapering may enhance the appearance of the cover 10 and/or more efficiently accommodate the volume of the compacted cushion 11.

The peripheral skirt 44 may include a first peripheral portion 54 that generally faces the first direction 14, but is slightly offset from the first direction 14 due to the taper of the peripheral skirt 44. A second peripheral portion 56 is positioned opposite the first peripheral portion 54. Similarly, a third peripheral portion 58 generally faces the third direction 18 with some offset. A fourth peripheral portion 60 is positioned opposite the third peripheral portion 58.

The frontal portions 40, 42 may be separated from each other by a frontal seam 70, which may have a generally horizontal disposition. In the configuration of FIG. 1, peripheral seams 72 are positioned in-plane with the frontal seam 70, and bisect each of the third and fourth peripheral portions 58, 60. The peripheral seams 72 may be nearly perpendicular to the frontal seam 70, with some offset from perpendicularity due to the tapered shape of the peripheral skirt 44.

Connecting seams 74 are disposed between the third and fourth peripheral portions 58, 60 and the rim 26. Additionally, connecting seams 76 may be disposed between the third and fourth peripheral portions 58, 60 and the first and second frontal portions 30, 32. The connecting seams 74, 76 may be disposed substantially perpendicular to the peripheral seam 72 and the frontal seam 70.

The seams 70, 72, 74, 76 may each be regions along which the cover 10 is weakened in some way to provide predictable tearing. Thus, the seams 70, 72, 74, 76 may be thinned regions, perforated regions, fissures across which the material of the cover 10 has been attached together through sewing or adhesive bonding, or any other configuration that provides the desired tear strength. According to certain embodiments, the seams 70, 72, 74, 76 are regions of comparatively thin cover material formed through a method such as mechanical scoring, laser scoring, or ultrasonic scoring. Alternatively, if the cover 10 is molded as a single piece through a method such as injection molding, the seams 70, 72, 74, 76 may be shaped in conjunction with the molding process.

The cover 10 may also be made at least partially flexible to enable deformation of the cover 10 so that the cover 10 is able to open. If desired, the cover 10 as a whole may be made somewhat pliable. Alternatively, the cover 10 may have regions with comparatively greater flexibility. Such regions may be made flexible through the use of a different material or treatment, or by geometric modification. For example, the flexible regions may take the form of hinges at which the material of the cover 10 is somewhat thin to permit folding. Nevertheless, the material is not thin enough to permit tearing, as at the seams 70, 72, 74, 76.

More specifically, the cover 10 may have inner hinges 80 disposed at the junctures of the first and second peripheral portions 54, 56 with the rim 26. The inner hinges 80 may thus permit folding (pivotal motion) of the first and second peripheral portions 54, 56 with respect to the rim 26. Additionally, the cover 10 may have outer hinges 82 disposed at the junctures of the first and second peripheral portions 54, 56 with the first and second frontal portions 40, 42, respectively. Hence, the frontal portions 40, 42 may also pivot with respect to the first and second peripheral portions 54, 56.

Of course, the inner hinges 80 or the outer hinges 82 may be used exclusively to open the frontal portions 40, 42. The use of only the inner hinges 80 may permit pivotal motion of the first and second peripheral portions 54, 56 as well as the frontal portions 40, 42. The use of both the inner hinges 80 and the outer hinges 82 may provide for more rapid and complete opening of the frontal portions 40, 42, thereby expediting deployment of the compacted cushion 11.

Additionally, the cover 10 may have peripheral hinges 84 disposed at the junctures of the first and second peripheral portions 54, 56 with the third and fourth peripheral portions 58, 60. The peripheral hinges 84 may permit the third and fourth peripheral portions 58, 60 to swing outward from the first and second peripheral portions 54, 56 Of course, the peripheral hinges 84 are optional; the connecting seams 76 may be omitted to keep the third and fourth peripheral portions 58, 60 affixed to the frontal portions 40, 42 during deployment. No peripheral hinges 84 would then be necessary.

The cover 10 may be made of a lightweight, formable material such as a thermoplastic, and may be manufactured through the use of any number of methods known in the art. For example, as mentioned previously, the cover 10 may be molded as a single piece. The seams 70, 72, 74, 76 and the hinges 80, 82, 84 may then be formed integrally with the molding process, or formed separately by performing additional processes such as scoring after molding is complete. The cover 10 may also be made by forming separate flaps and attaching the flaps together by sewing, adhesive or chemical bonding, mechanical fastening, or some other known attachment method. Those of skill in the art will recognize that other manufacturing processes may be applied in place of or in addition to those mentioned above.

Figure 2:
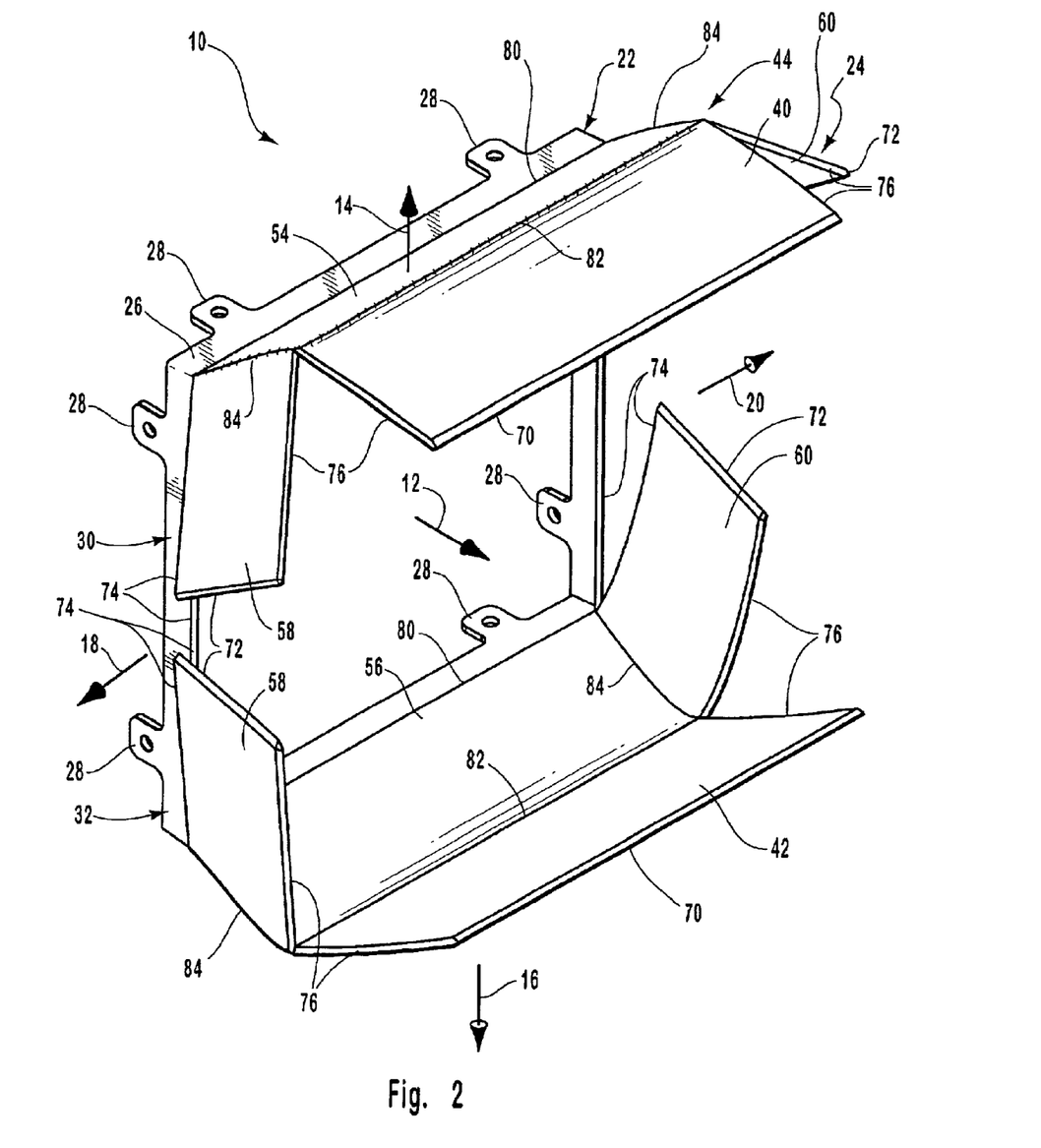
FIG. 2 is a perspective view of the cover of FIG. 1 in an at least partially deployed position to permit emergence of the compacted cushion along multiple axes.

Referring to FIG. 2, a perspective view shows the cover 10 in an at least partially deployed configuration that permits emergence of the compacted cushion 11. The view of FIG. 2 assumes that all of the seams 70, 72, 74, 76 and hinges 80, 82, 84 have been included and disposed as shown in FIG. 1. The compacted cushion 11 has been omitted for clarity.

As shown, the frontal seam 70 has torn to permit separation of the first and second frontal portions 40, 42. The peripheral seams 72 have torn to permit separation of each of the third and fourth peripheral portions 58, 60 into a pair of flaps, each of which is attached to the first peripheral portion 54 or the second peripheral portion 56 via one of the peripheral hinges 84. The connecting seams 74 have torn to permit separation of the flaps of the third and fourth peripheral portions 58, 60 from the rim 26. Additionally, the connecting seams 76 have torn to permit separation of the flaps of the third and fourth peripheral portions 58, 60 from the first and second frontal portions 40, 42.

Furthermore, the inner hinges 80 have folded to permit pivotal motion between the rim 26 and the first and second peripheral portions 54, 56. The outer hinges 82 have folded to permit pivotal motion between the first and second peripheral portions 54, 56 and the frontal portions 40, 42. The peripheral hinges 84 have folded to permit pivotal motion between the first and second peripheral portions 54, 56 and the separated flaps of the third and fourth peripheral portions 58, 60.

The seams 70, 72, 74, 76 are interconnected. In fact, seams 70, 72, and 76 are interconnected at a single point. Therefore, a tear in one of the seams 70, 72, 74, 76 may be expected to propagate through the other seams 70, 72, 74, 76 until all of the seams 70, 72, 74, 76 have been torn open. Each of the seams 70, 72, 74, 76 has a tear strength; the tear strength of each of the seams 70, 72, 74, 76 may be selected such that the tear consistently propagates completely through all of the seams 70, 72, 74, 76.

Within the scope of the invention, the initial tear may appear in any of the seams 70, 72, 74, 76. Thus, the frontal seam 70 may tear first, and the tear may propagate from the frontal seam 70 to the peripheral seams 72 and the connecting seams 74, 76. Alternatively, one or more of the peripheral seams 72 and the connecting seams 74, 76 may open first, and the tear may then propagate to the frontal seam 70.

In any case, opening of the peripheral portions 54, 56, 58, 60 does not depend on whether the frontal seam 70 has opened. The tear strength of the peripheral seams 72 and the connecting seams 74, 76 is low enough that the peripheral seams 72 and the connecting seams 74, 76 open even if some of the outward pressure of the inflating compacted cushion 11 is relieved through expansion of the compacted cushion 11 in the frontal direction 12.

If the seams 70, 72, 74, 76 are thinned regions of the material of the cover 10, the strength of each of the seams 70, 72, 74, 76 can be adjusted by altering the thickness of the seam 70, 72, 74, or 76. It may be beneficial to select the tear strengths of the seams 70, 72, 74, 76 such that the seams 70, 72, 74, 76 open substantially simultaneously to permit initial expansion of the compacted cushion 11 in all of the directions 12, 14, 16, 18, 20. It may even be beneficial to select the tear strengths such that the peripheral seams 72 and/or the connecting seams 74, 76 tear before the frontal seams 70. Thus, expansion may commence in the first, second, third, and fourth directions 14, 16, 18, 20 prior to expansion in the frontal direction 12 to further increase the area covered by the compacted cushion 11 prior to impact of the vehicle occupant.

"Opening" a portion of the cover 10 may be defined as removing the portion of the cover from a position in which the portion obstructs motion of the compacted cushion 11 in one of the directions 12, 14, 16, 18, 20. Hence, the cover 10 has opened to permit emergence of the compacted cushion 11 in the frontal direction 12 by separating the frontal portions 40, 42 from each other.

The cover 10 has also opened to permit emergence of the compacted cushion 11 in the first and second directions 14, 16 by permitting the first and second peripheral portions 54, 56 to pivot away from the stowed position of the compacted cushion 11. The first and second peripheral portions 54, 56 may even pivot far enough to be parallel with the first and second directions 14, 16, thereby further reducing the obstruction to motion of the compacted cushion 11 in the first and second directions 14, 16.

Furthermore, the cover 10 has opened to permit emergence of the compacted cushion 11 in the third and fourth directions 18, 20 by permitting the flaps of the third and fourth peripheral portions 58, 60 to pivot outward with respect to the first and second peripheral portions 54, 56. The flaps of the third and fourth peripheral portions 58, 60 may also pivot further than shown to approach parallelism with the third and fourth directions 18, 20, thereby further reducing obstruction to motion of the compacted cushion 11 in the third and fourth directions 18, 20.

Hence, the cover 10 of FIGS. 1 and 2 has opened to permit emergence of the compacted cushion 11 in the frontal direction 12, as well as the first, second, third, and fourth directions 14, 16, 18, 20. Since the first and second directions 14, 16 are coaxial and the third and fourth directions 18, 20 are coaxial, the directions 12, 14, 16, 18, 20 provide three axes of expansion that are substantially perpendicular to each other. The protective capacity of the compacted cushion 11 thus extends to a comparatively larger perimeter within the time required to provide impact protection. Additionally, the mass of the inflation gas is channeled in several directions, thereby avoiding the additional impact produced by a concentrated gas flow directed at the vehicle occupant.

Of course, the cover 10 of FIGS. 1 and 2 is merely exemplary. The same benefits may be obtained with a wide variety of other cover configurations. Such cover configurations may be adapted to suit a particular type of cushion. FIGS. 3 through 6 depict alternative embodiments of airbag covers designed to permit multi-axial expansion of an inflatable cushion.

Figure 3:
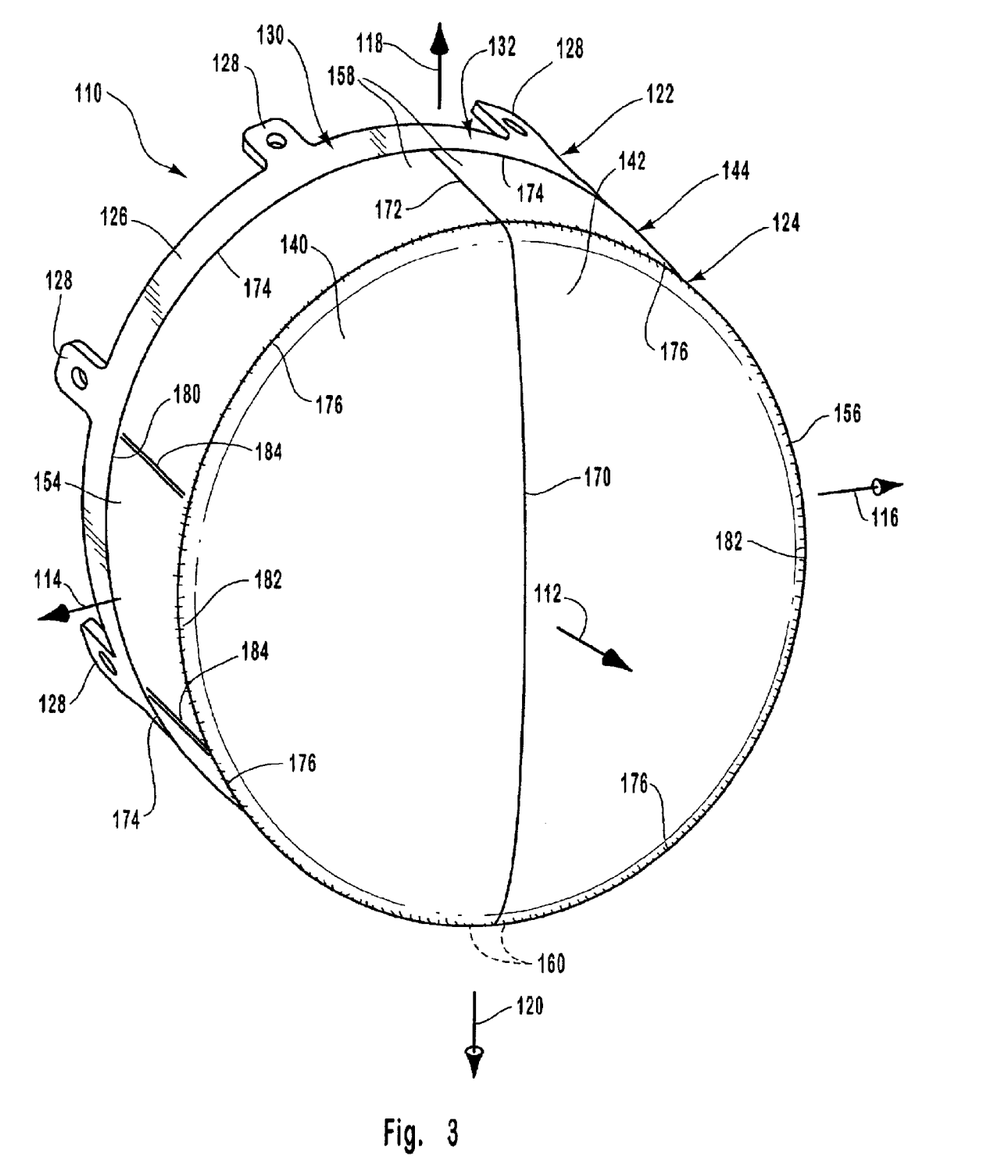
FIG. 3 is a perspective view of an alternative embodiment of an airbag cover within the scope of the invention, in a stowed configuration.

Referring to FIG. 3, a perspective view shows an alternative embodiment of a cover 110 that covers a compacted airbag cushion. The cover 110 is shown in the stowed configuration. The cushion has been omitted for clarity. The cover 110 is oriented vertically rather than horizontally like the cover 10 of the previous embodiment. Like the cover 10 of FIGS. 1 and 2, the cover 110 has a frontal direction 112, a first direction 114, a second direction 116, a third direction 118, and a fourth direction 120. The directions 114, 116, 118, 120 of the cover 110 have been rotated 90° from those of the cover 10 to match the orientation of the cover 110.

The cover 110 may also have a vehicle attachment portion 122 and a deployment portion 124 that opens to release the cushion. As shown, the vehicle attachment portion has a rim 126 and a plurality of tabs 128 disposed around the rim 126 to attach the cover 110 to the vehicle. The cover 110 may have first and second sections 130, 132 horizontally displaced from each other; the first and second sections 130, 132 separate to permit emergence of the cushion.

The cover 110 also has a first frontal portion 140 and a second frontal portion 142. As shown, the frontal portions 140, 142 may combine to form an elliptical shape, rather than a rectangle like the frontal portions 40, 42 of the previous embodiment. Hence, the cover 110 may have a generally elliptical shape. The cover 110 may also have a peripheral skirt 144 adjoining the frontal portions 140, 142 in a substantially elliptical pathway. Unlike the peripheral skirt 44 of the previous embodiment, the peripheral skirt 144 is not tapered.

Even though the peripheral skirt 144 has no distinct corners, the peripheral skirt may be separated into portions like that of the previous embodiment. More specifically, the peripheral skirt 144 may have a first peripheral portion 154 generally perpendicular to the first direction 114 and a second peripheral portion 156 positioned opposite the first peripheral portion 154. Similarly, the peripheral skirt 144 may have a third peripheral portion 158 generally perpendicular to the third direction 158 and a fourth peripheral portion 160 positioned opposite the third peripheral portion 158.

The frontal portions 140, 142 may be separated from each other by a frontal seam 170. Unlike the frontal seam 70, the frontal seam 170 is disposed vertically. Hence, the first and second sections 130, 132 move away from each other in a generally horizontal direction instead of a vertical direction. The third and fourth peripheral portions 158, 160 are each bisected by a peripheral seam 172. The third and fourth peripheral portions 158, 160 are separated from the rim 126 and from the frontal portions 140, 142 by connecting seams 174 and by connecting seams 176, respectively.

The cover 110 may also have inner hinges 180 disposed at the junctures of the first and second peripheral portions 154, 156 with the rim 126. Outer hinges 182 may be located at the junctures of the first and second peripheral portions 154, 156 with the first and second frontal portions 140, 142, respectively. Additionally, peripheral hinges 184 may be positioned at the junctures of the first and second peripheral portions 154, 156 with the third and fourth peripheral portions 158, 160.

Figure 4:
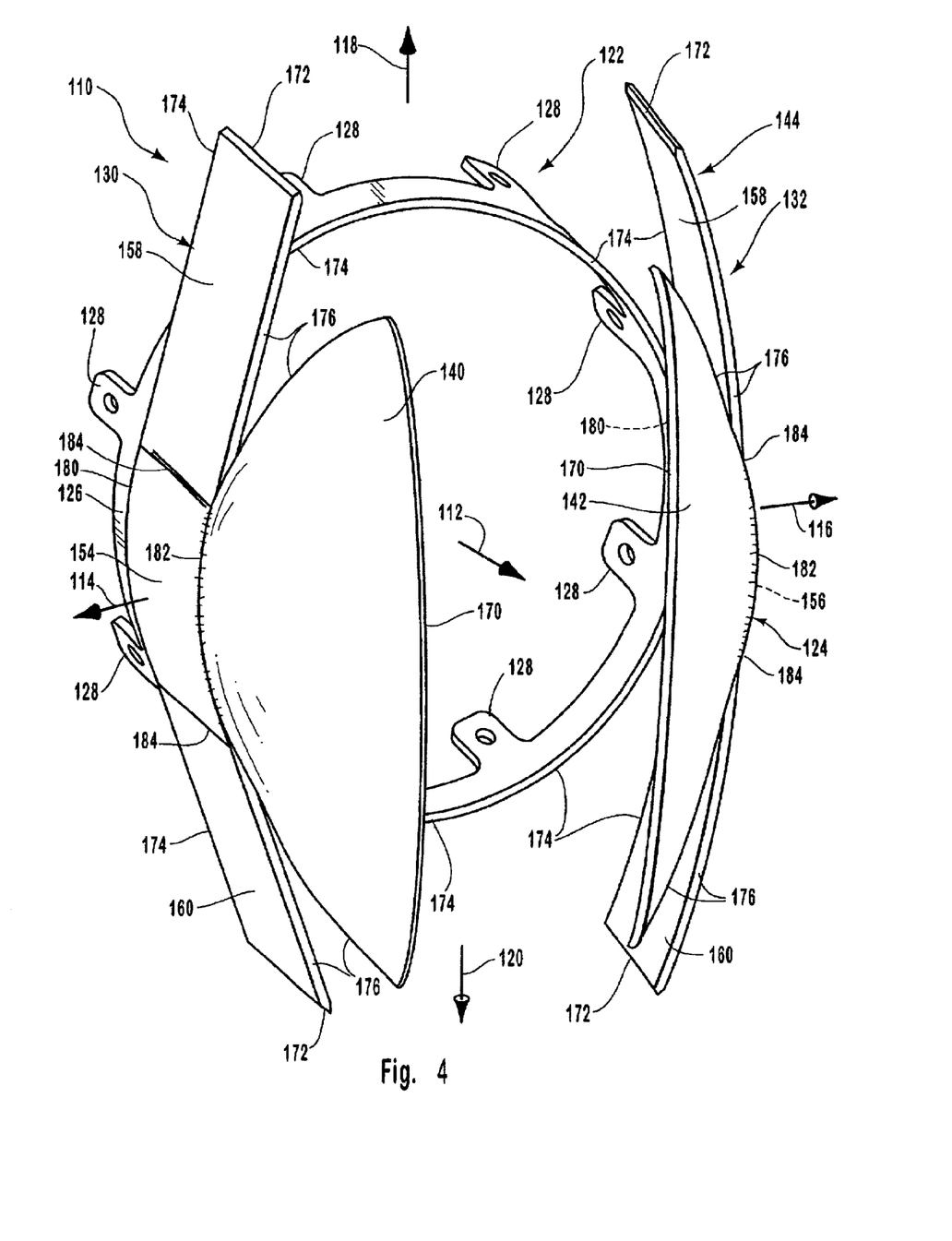
FIG. 4 is a perspective view of the cover of FIG. 3 in an at least partially deployed position to permit emergence of the compacted cushion along multiple axes.

Referring to FIG. 4, a perspective view shows the cover 110 of FIG. 3 in an at least partially deployed position. The seams 70, 72, 74, 76 have torn in a manner similar to that of the previous embodiment. The frontal portions 140, 142 have separated horizontally rather than vertically. In any case, the cover 110 has been opened such that the cushion can expand in all of the directions 112, 114, 116, 118, 120.

Thus, a wide variety of cover characteristics may be varied within the scope of the invention. The overall shape of the cover, the presence or absence of a taper, and the orientation of seams are all characteristics for which considerable variation is anticipated by the invention. Those of skill in the art will recognize that many other cover characteristics may be varied within the scope of the invention.

Another characteristic subject to variation is the type of cushion enclosed by the cover. The covers 10, 110 of the previous embodiments have length and width dimensions that are generally near equality. Hence, they are well suited to front impact airbags, knee bolsters, and other airbags designed to deploy from a comparatively compact enclosure. The apparatus and method of the present invention may also be adapted for use with airbags that require an elongated mounting, such as side impact airbags, or "inflatable curtains." FIGS. 5 and 6 depict one example of an airbag cover designed to permit multi-axial deployment of such an airbag.

Figure 5:
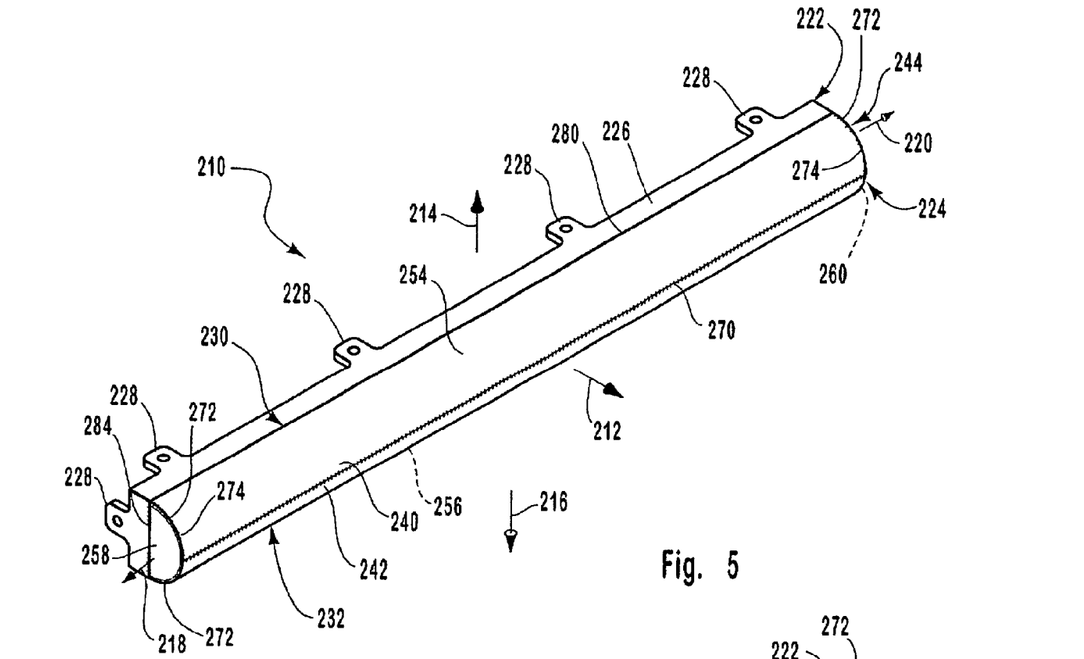
FIG. 5 is a perspective view of another alternative embodiment of an airbag cover, for use with an elongated cushion such as an inflatable curtain, within the scope of the invention, in a stowed configuration.
Figure 6:
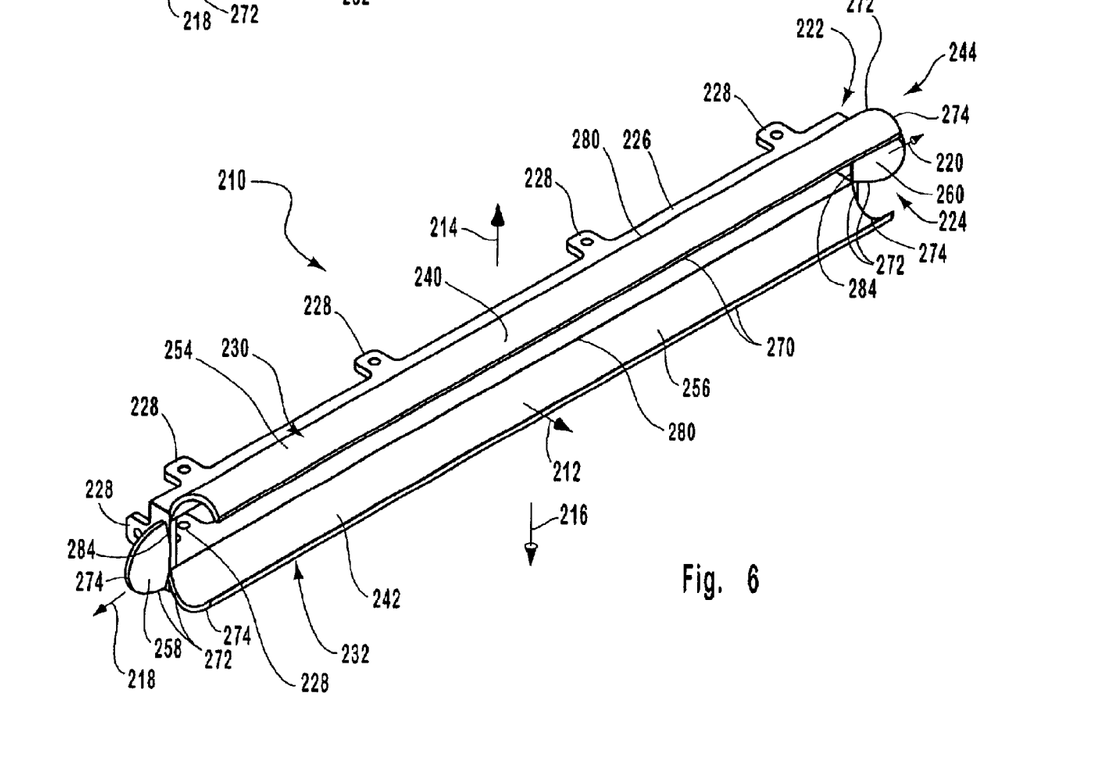
FIG. 6 is a perspective view of the cover of FIG. 5 in an at least partially deployed position to permit emergence of the elongated cushion along multiple axes.

Referring to FIG. 5, a perspective view shows a cover 210, according to an alternative embodiment, in the stowed configuration. The cover 210 may be designed to contain an elongated airbag such as an inflatable curtain (not shown). The cover 210 is shown with a straight disposition; however, the cover 210 may be mounted to a somewhat curved surface such as an interior surface spanning the roof rail and a portion of the A-pillar of a vehicle.

The cover 210 may have a frontal direction 212, a first direction 214, a second direction 216, a third direction 218, and a fourth direction 220. The directions 212, 214, 216, 218, 220 may be arrayed substantially the same as the directions 12, 14, 16, 18, 20 of FIGS. 1 and 2. A vehicle attachment portion 222 is designed to be attached to the vehicle, and a deployment portion 224 opens to release the cushion during deployment. The vehicle attachment portion 222 may have a rim 226 and a plurality of tabs 228 arrayed about the rim 228 for attachment to the vehicle.

The cover 210 may have a first section 230 and a second section 232 that split from each other to release the cushion. As with the embodiment of FIGS. 1 and 2, the first and second sections 230, 232 are vertically displaced from each other and may move apart in generally vertical directions. First and second frontal portions 240, 242 are disposed on the first and second sections 230, 232, respectively. A peripheral skirt 244 adjoins the first and second frontal portions 240, 242.

As shown, the cover 210 has a generally elongated, rectangular shape when viewed from along the frontal direction 212. However, the frontal portions 240, 242 are not flat, but are rounded such that the first and second frontal portions 240, 242, together, form a generally half-cylindrical shape. The peripheral skirt 244 includes first and second peripheral portions 254, 256 that are disposed along the length of the first and second frontal portions 240, 242, respectively, and that are oriented generally perpendicular to the first and second directions 214, 216. Third and fourth peripheral portions 218, 220 are generally perpendicular to the third and fourth direction 218, 220, and form end caps of the half-cylindrical shape of the frontal portions 240, 242.

As with the previous embodiments, the frontal portions 240, 242 are separated by a frontal seam 270. However, peripheral seams 272 of the cover 210 are arrayed somewhat differently than those of the previous embodiments. More specifically, rather than bisecting the third and fourth peripheral portions 258, 260, the peripheral seams 272 may be positioned at the junctures between the third and fourth peripheral portions 258, 260 and the first and second peripheral seams 254, 256. Connecting seams may then be positioned between the third and fourth peripheral portions 258, 260 and the frontal portions 240, 242. Hence, the frontal seam 270 is joined to the peripheral seams 272 via the connecting seams 274.

The cover 210 may also have inner hinges 280 disposed at the junctures of the first and second peripheral portions 254, 256 with the rim 226. Additionally, the cover 210 may have peripheral hinges disposed at the junctures of the third and fourth peripheral portions 258, 260 with the rim 226. However, no outer hinges need be used. The first and second frontal portions 240, 242 may simply remain comparatively rigidly attached to the first and second peripheral portions 258, 260, respectively. Of course, the material of the cover 210 may still flex apart from the flexure of the hinges 280, 284.

Referring to FIG. 6, a perspective view shows the cover 210 of FIG. 5 in an at least partially deployed configuration. The seams 270, 272, 274 have all torn to open the cover 210 such that the cushion can expand in all of the directions 212, 214, 216, 218, 220. The inner hinges 280 have been folded to permit the first and second peripheral portions 254, 256 to pivot with respect to the rim 226, together with the first and second frontal portions 240, 242, respectively. The peripheral hinges 282 have also folded to permit pivotal motion between the third and fourth peripheral portions 258, 260 and the rim 226.

Although the third and fourth peripheral portions 258, 260 remain attached to the rim 226 in the cover 210 of FIGS. 5 and 6, the third and fourth peripheral portions 258, 260 still open to permit expansion of the cushion in the third and fourth directions 218, 220. Similarly, although the first and second peripheral portions 254, 256 and the first and second frontal portions 240, 242, respectively, do not substantially pivot with respect to each other, the frontal portions 240, 242 open with the first and second peripheral portions 254, 256 to permit expansion of the cushion in the frontal direction 212 as well as in the first and second directions 214, 216. Hence, the cover 210 of FIGS. 5 and 6 also permits tri-axial expansion of the cushion.

If desired, the frontal direction 212 need not be oriented toward the user, but may instead be oriented along a window or other vehicle surface. Many of the benefits of the invention may still be obtained if the cushion does not inflate directly toward the vehicle occupant. Indeed, if desired, the cover 210 need not be symmetrical. The frontal seam 270 may, for example, be positioned closer to the first direction 214 or to the second direction 216, depending on the desired inflation direction.

In any case, like the covers 10, 110 of FIGS. 1 through 4, the cover 210 of FIGS. 5 and 6 also provides enhanced protection for vehicle occupants. Through the use of multiple axes of expansion, the cushion may rapidly cover a comparatively large area. Furthermore, the mass of the inflation gas may be distributed and directed in multiple directions, thereby lessening the impact of the airbag against the cushion.

The covers and associated methods of the present invention provide a significant advancement in airbag design. By allowing inflatable cushions to inflate to cover a larger area, the covers of the present invention may provide enhanced protection for occupants disposed outside their nominal positions within the vehicle. Furthermore, through the use of mass distribution and momentum redirection, inflatable cushions may decrease the likelihood of injury as a result of impact of the vehicle occupant with the cushion. Thus, the overall effectiveness of airbags may be enhanced through the use of the covers and associated methods of the invention.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A cover for covering a compacted cushion of an airbag, the cover comprising
a first frontal portion;
a second frontal portion that separates from the first frontal portion in response to expansion of the compacted cushion to permit emergence of the compacted cushion between the first and second frontal portions in a frontal direction;
a peripheral skirt adjoining the first and second frontal portions, wherein the peripheral skirt opens away from the compacted cushion in response to expansion of the compacted cushion to permit emergence of the compacted cushion in a first direction substantially perpendicular to the frontal direction and a third direction substantially perpendicular to the frontal direction and the first direction;
wherein the peripheral skirt is connected to the first frontal portion by a connecting seam on either side of which the peripheral skirt and the first frontal portion are non-parallel to each other;
wherein the peripheral skirt is configured to open regardless of whether separation of the first and second frontal portions has occurred; and
a plurality of additional seams, the connecting seam and each of the additional seams having a tear strength selected to open the peripheral skirt regardless of whether separation of the first and second frontal portions has occurred, wherein the connecting seam and each of the additional seams has a tear strength selected to cause the peripheral skirt to open prior to separation of the first and second frontal portions.

2. The cover of claim 1, wherein the additional seams comprise a frontal seam disposed between the first and second frontal portions and at least one peripheral seam disposed on the peripheral skirt, wherein the peripheral seam has a tear strength lower than a tear strength of the frontal seam.

3. The cover of claim 1, further comprising:
an inner hinge that folds to open the cover in the first direction; and
a peripheral hinge that folds to open the cover in the third direction.

4. The cover of claim 1, wherein the connecting seam and each of the additional seams comprises a non-perforated region of comparatively thin cover material.

5. The cover of claim 1, wherein the additional seams comprise a frontal seam disposed between the first and second frontal portions and at least one peripheral seam disposed on the peripheral skirt, non-parallel to the first and second frontal portions, wherein at least a portion of the peripheral seam is disposed substantially in-plane with the frontal seam such that a third peripheral portion of the peripheral skirt splits open to permit emergence of the compacted cushion in the third direction.

6. The cover of claim 1, wherein the additional seams comprise a frontal seam disposed between the first and second frontal portions and at least two peripheral seams disposed on the peripheral skirt, non-parallel to the first and second frontal portions, such that a third peripheral portion of the peripheral skirt pivots outward between the peripheral seams to permit emergence of the compacted cushion in the third direction.

7. The cover of claim 1, wherein each of the first and second frontal portions has a rectangular shape.

8. The cover of claim 1, wherein the peripheral skirt further opens away from the compacted cushion in response to expansion of the compacted cushion to permit emergence of the compacted cushion in a second direction opposite to the first direction and a fourth direction opposite to the third direction.

9. The cover of claim 1, wherein the cover is adapted for use with an airbag selected from the group consisting of a driver's side airbag, a passenger's side airbag, an inflatable curtain for side impact protection, and a knee bolster.

10. A section of a cover for covering a compacted cushion of an airbag, the section comprising:
 a first frontal portion that is movable to permit expansion of the compacted cushion in a frontal direction;
 a first peripheral portion adjoining the first frontal portion, wherein the first peripheral portion opens away from the compacted cushion in response to expansion of the compacted cushion to permit emergence of the compacted cushion in a first direction substantially perpendicular to the frontal direction; and
 a third peripheral portion adjacent to the first frontal portion and the first peripheral portion, wherein the third peripheral portion opens away from the compacted cushion in response to expansion of the compacted cushion to permit emergence of the compacted cushion in a third direction substantially perpendicular to the frontal direction and the first direction;
 wherein the first and third peripheral portions are connected together by a peripheral hinge extending non-parallel to the first frontal portion.

11. The section of claim 10, wherein the first frontal portion is disposed adjacent to a second frontal portion of a second section, the second section having a second peripheral portion disposed opposite the first peripheral portion and a fourth peripheral portion disposed opposite the third peripheral portion, wherein the first and fourth peripheral portions, the second and third peripheral portions, and the second and fourth peripheral portions are each directly connected together by additional peripheral hinges, wherein the additional peripheral hinges fold to permit the third and fourth peripheral portions to open.

12. The section of claim 10, further comprising a plurality of seams, each of the seams having a tear strength selected to open the first and third peripheral portions regardless of whether separation of the first and second frontal portions has occurred.

13. The section of claim 12, further comprising an inner hinge that folds to open the first peripheral portion.

14. The section of claim 12, wherein the seams comprise a frontal seam disposed along an edge of the first frontal portion and at least one peripheral seam disposed substantially in-plane with the frontal seam, non-parallel to the first and second frontal portions, to permit the third peripheral portion to split from a coplanar peripheral portion of a second section disposed opposite the first section to permit emergence of the compacted cushion in the third direction.

15. A seam system for a cover for covering a compacted cushion of an airbag, the seam system comprising:
 a frontal seam that separates a first frontal portion of the cover from a second frontal portion of the cover;
 at least one peripheral seam disposed on a peripheral skirt of the cover; and
 at least one connecting seam disposed substantially perpendicular to the frontal seam and to at least a portion of the peripheral seam; wherein the frontal seam, peripheral seam, and connecting seam are interconnected at a single point to open the cover in at least three substantially perpendicular directions to permit emergence of the compacted cushion in the three substantially perpendicular directions;
 wherein the tear strength of the peripheral seam is lower than the tear strength of the frontal seam.

16. The seam system of claim 15, wherein the peripheral seam has a tear strength selected in relation to a tear strength of the frontal seam to permit the peripheral skirt to open prior to separation of the first and second frontal portions.

17. The seam system of claim 15, wherein the frontal seam and the peripheral seam each comprise a non-perforated region of comparatively thin cover material.

18. The seam system of claim 15, wherein at least a portion of the peripheral seam is disposed substantially in-plane with the frontal seam, non-parallel to the first and second frontal portions, such that a third peripheral portion of the peripheral skirt splits open to permit emergence of the compacted cushion, wherein the third peripheral portion is disposed substantially within a single plane prior to deployment.

19. A method for releasing a compacted cushion of an airbag from a cover to permit deployment of the compacted cushion, the cover having a first frontal portion, a second frontal portion, and a peripheral skirt adjoining the first and second frontal portions, the method comprising:
 initiating expansion of the compacted cushion;
 separating the first and second frontal portions along a frontal seam in response to expansion of the compacted cushion to permit emergence of the compacted cushion between the first and second frontal portions in a frontal direction; and
 opening the peripheral skirt away from the compacted cushion in response to expansion of the compacted cushion to permit emergence of the compacted cushion in a first direction substantially perpendicular to the frontal direction and a third direction substantially perpendicular to the frontal direction and the first direction;
 wherein opening the peripheral skirt comprises tearing a connecting seam that connects the peripheral skirt to the first frontal portion, wherein on either side of the connecting seam, the peripheral skirt and the first frontal portion are non-parallel to each other;
 wherein expansion of the compacted cushion triggers opening of the peripheral skirt regardless of whether separation of the first and second frontal portions has occurred, wherein the peripheral skirt opens prior to separation of the first and second frontal portions.

20. The method of claim 19, wherein opening the peripheral skirt comprises tearing a peripheral seam disposed on the peripheral skirt.

21. The method of claim 20, wherein the peripheral skirt opens substantially simultaneously with separation of the first and second frontal portions.

22. The method of claim 20, wherein separating the first and second frontal portions comprises folding the cover along an inner hinge to permit relative motion of the first and second frontal portions, and wherein opening the peripheral skirt comprises folding the cover along a peripheral hinge extending non-parallel to the first frontal portion.

23. The method of claim 20, wherein opening the peripheral skirt comprises tearing the peripheral seam such that a third peripheral portion of the peripheral skirt splits open to permit emergence of the compacted cushion in the third direction, wherein the third peripheral portion is disposed substantially within a single plane prior to deployment.

24. The method of claim 20, wherein opening the peripheral skirt further comprises tearing a second peripheral seam disposed on the peripheral skirt, wherein the peripheral seams tear such that a third peripheral portion of the skirt pivots outward between the peripheral seams to permit emergence of the compacted cushion in the third direction.

25. The method of claim 19, further comprising opening the peripheral skirt away from the compacted cushion in response to expansion of the compacted cushion to permit emergence of the compacted cushion in a second direction substantially opposite to the first direction and a fourth direction substantially opposite to the third direction.

* * * * *